(12) United States Patent
Whitehead

(10) Patent No.: US 8,085,196 B2
(45) Date of Patent: Dec. 27, 2011

(54) REMOVING BIASES IN DUAL FREQUENCY GNSS RECEIVERS USING SBAS

(75) Inventor: Michael L. Whitehead, Scottsdale, AZ (US)

(73) Assignee: Hemisphere GPS LLC, Calgary, Alberta (CA)

( * ) Notice: Subject to any disclaimer, the term of this patent is extended or adjusted under 35 U.S.C. 154(b) by 294 days.

(21) Appl. No.: 12/401,948

(22) Filed: Mar. 11, 2009

(65) Prior Publication Data
US 2010/0231443 A1    Sep. 16, 2010

(51) Int. Cl.
*G01S 19/07* (2010.01)
*G01S 19/40* (2010.01)

(52) U.S. Cl. .................. 342/357.44; 342/357.23

(58) Field of Classification Search ............. 342/357.23, 342/357.44, 357.46, 357.62; 701/213, 215
See application file for complete search history.

(56) References Cited

U.S. PATENT DOCUMENTS

| | | | |
|---|---|---|---|
| 3,585,537 A | 6/1971 | Rennick et al. | |
| 3,596,228 A | 7/1971 | Reed, Jr. et al. | |
| 3,727,710 A | 4/1973 | Sanders et al. | |
| 3,815,272 A | 6/1974 | Marleau | |
| 3,899,028 A | 8/1975 | Morris et al. | |
| 3,987,456 A | 10/1976 | Gelin | |
| 4,132,272 A | 1/1979 | Holloway et al. | |
| 4,170,776 A | 10/1979 | MacDoran | |
| 4,180,133 A | 12/1979 | Collogan et al. | |
| 4,398,162 A | 8/1983 | Nagai | |
| 4,453,614 A | 6/1984 | Allen et al. | |
| 4,529,990 A | 7/1985 | Brunner | |
| 4,637,474 A | 1/1987 | Leonard | |
| 4,667,203 A | 5/1987 | Counselman, III | |
| 4,689,556 A | 8/1987 | Cedrone | |
| 4,694,264 A | 9/1987 | Owens et al. | |
| 4,710,775 A | 12/1987 | Coe | |
| 4,714,435 A | 12/1987 | Stipanuk et al. | |
| 4,739,448 A | 4/1988 | Rowe et al. | |
| 4,751,512 A | 6/1988 | Longaker | |
| 4,769,700 A | 9/1988 | Pryor | |
| 4,785,463 A | 11/1988 | Janc et al. | |
| 4,802,545 A | 2/1989 | Nystuen et al. | |

(Continued)

FOREIGN PATENT DOCUMENTS

JP    07244150    9/1995

(Continued)

OTHER PUBLICATIONS

Takac, Frank et al., "SmartRTK: A Novel Method of Processing Standardised RTCM Network RTK Information for High Precision Positioning", *Proceedings of ENC GNSS 2008*, Toulouse, France, (Apr. 22, 2008).

(Continued)

*Primary Examiner* — Dao Phan
(74) *Attorney, Agent, or Firm* — Law Office of Mark Brown, LLC; Mark E. Brown

(57) ABSTRACT

A method for removing biases in dual frequency GNSS receivers circumvents the need for ionosphere corrections by using L2(P) in combination with either L1(P) or L1(C/A) to form ionosphere-free ranges. A table of biases is stored in microprocessor controller memory and utilized for computing a location using corrected ionosphere-free pseudo ranges. A system for removing biases in dual frequency GNSS receivers includes a dual frequency GNSS receiver and a controller microprocessor adapted to store a table of bias values for correcting pseudo ranges determined using L2(P) in combination with either L1(P) or L1(C/A).

6 Claims, 2 Drawing Sheets

U.S. PATENT DOCUMENTS

| | | |
|---|---|---|
| 4,812,991 A | 3/1989 | Hatch |
| 4,813,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalia |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland et al. |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen et al. |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison et al. |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cozenza et al. |
| 5,875,408 A | 2/1999 | Pinto |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller et al. |
| 6,014,101 A | 1/2000 | Loomis |
| 6,014,608 A | 1/2000 | Seo |
| 6,018,313 A | 1/2000 | Englemayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,122,595 A | 9/2000 | Varley et al. |
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |

| | | |
|---|---|---|
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Aheam et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,875 B1 | 12/2003 | Zeng et al. |
| 6,671,587 B2 | 12/2003 | Hrovat et al. |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,900,992 B2 | 5/2005 | Kelly et al. |
| 6,922,635 B2 | 7/2005 | Rorabaugh |
| 6,931,233 B1 | 8/2005 | Tso et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,162,348 B2 | 1/2007 | McClure et al. |
| 7,191,061 B2 | 3/2007 | McKay et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altman |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 2003/0014171 A1 | 1/2003 | Ma et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0212533 A1 | 10/2004 | Whitehead et al. |
| 2005/0080559 A1 | 4/2005 | Ishibashi et al. |
| 2005/0225955 A1 | 10/2005 | Grebenkemper et al. |
| 2005/0265494 A1 | 12/2005 | Goodlings |
| 2006/0167600 A1 | 7/2006 | Nelson et al. |
| 2006/0215739 A1 | 9/2006 | Williamson et al. |
| 2007/0078570 A1 | 4/2007 | Dai et al. |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2009/0171583 A1 | 7/2009 | DiEsposti |
| 2009/0174587 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Bing-Fei |
| 2010/0085249 A1 | 4/2010 | Ferguson et al. |
| 2010/0085253 A1 | 4/2010 | Ferguson et al. |
| 2010/0117899 A1 | 5/2010 | Papadimitratos et al. |
| 2010/0117900 A1 | 5/2010 | van Diggelen et al. |

FOREIGN PATENT DOCUMENTS

| WO | WO9836288 | 8/1998 |
|---|---|---|
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |

OTHER PUBLICATIONS

"International Search Report", PCT/US09/33567, (Feb. 9, 2009).
"International Search Report and Written Opinion", PCT/IB2008/003796,, (Jul. 15, 2009).
"International Search Report,", PCT/US09/34376, (Nov. 2, 2009).
Parkinson, Bradford W., et al., "Global Positioning System: Theory and Applications, vol. II", *Bradford W. Parkinson and James J. Spiker, Jr., eds., Global Postioning System: Theory and Applications*, vol. II,1995, AIAA, Reston, VA, USA, pp. 3-50, (1995),3-50.
"Orthman Manufacturing Co., www.orthman.com/htm;guidance.htm", 2004, regarding the "Tracer Quick-Hitch".
Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics, Inc., (May 2004), 136-143.
Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).
Han, Shaowel et al., "Single-Epoch Ambiguity Resolution for Real-Time GPS Attitude Determinaion with the Aid of One-Dimensional Optical Fiber Gyro", *GPS Solutions*, vol. 3, No. 1, pp. 5-12 (1999) John Wiley & Sons, Inc.
Park, Chansik et al., "Integer Ambiguity Resolution for GPS Based Attitude Determination System", *SICE 1998*, Jul. 29-31, Chiba, 1115-1120.
Last J. D. et al., "Effect of skywave interference on coverage of radiobeacon DGPS stations", *IEEE Proc.-Radar, Sonar Navig.*, vol. 144, No. 3, Jun. 1997, pp. 163-168.
"International Search Report and Written Opinion", PCT/US2004/015678, filed May 17, 2004, Jun. 21, 2005.
"ISO", *11783 Part 7 Draft Amendment 1 Annex, Paragraphs B.6 and B.7.ISO 11783-7 2004 DAM1, ISO*: Mar. 8, 2004.
Kaplan, E D., "Understanding GPS: Principles and Applications", *Artech House*MA, 1996.
Irsigler, M et al., "PPL Tracking Performance in the Presence of Oscillator Phase Noise", *GPS Solutions*, vol. 5, No. 4, pp. 45-57 (2002).
Ward, Phillip W., "Performance Comparisons Between FLL., PLL and a Novel FLL-Assisted-PLL Carrier Tracking Loop Under RF Interference Conditions", *11th Int. Tech Meeting of the Satellite Division of the U.S. Inst. of Navigation*Nashville, TN, Sep. 15-18, 1998, 783-795.
Bevly, David M., "Comparison of INS v. Carrier-Phase DGPS for Attitude Determination in the Control of Off-Road Vehicles" *ION 55th Annual Meeting*: Jun, 28-30, 1999; Cambridge, Massachusetts; pp. 497-504.
Keicher, R. et al,, "Automatic, Guidance for Agricultural Vehicles in Europe", *Computers and Electronics in Agriculture*, vol. 25, (Jan. 2000), 169-194.
"International Search Report", PCT/US09/49776, (Aug. 11, 2009).
"International Search Report", PCT/AU/2008/000002, (Feb. 28, 2008.
"International Search Report", PCT/US09/33693, (Mar. 30, 2009).
"International Search Report", PCT/US09/039686, (May 26, 2009).
"International Search Report", PCT/US09/067693.
"International Search Report / Written Opinion", PCT/US09/63594, (Jan. 11, 2010).
"International Search Report", PCT/US09/60668, (Dec. 9, 2009).
"International Search Report and Written Opinion", PCT/US10/21334, (Mar. 12, 2010).
Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdf, (Jul. 12, 2006).
"Eurocontrol, Pegasus Technical Notes on SBAS", report [*online*], Dec. 7, 2004 [*retrieved on May 18, 2010*]. *Retrieved from the Internet:* <URL: http://www.icao.int/icao/en/ro/nacc/meetings/2004/gnss/documentation/Pegasus/tn.pdf>, (Dec. 7, 2004), p. 89 paras [0001]-[0004].
"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004), p. 168 para [0001].
Schaer, et al., "Determination and Use of GPS Differential Code Bias Values", Presentation [online]. Revtrieved May 18, 2010. Retrieved from the internet: >http://nng.esoc.esa.de/ws2006/REPR2.pdf>, (May 8, 2006).
"International Search Report", PCT/US10/26509., Apr. 20, 2010.

REMOVING BIASES IN DUAL FREQUENCY GNSS RECEIVERS USING SBAS

BACKGROUND OF THE INVENTION

1. Field of the Invention

The present invention relates generally to global navigation satellite systems (GNSS), and in particular to removing biases in dual frequency GNSS receivers.

2. Description of the Related Art

The Global Positioning System (GPS) was established by the United States government, and employs a constellation of 24 or more satellites in well-defined orbits at an altitude of approximately 26,500 km. These satellites continually transmit microwave L-band radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracies can be achieved depending on the techniques deployed. For example, processing carrier phase observations both from a mobile/remote receiver and from one or more fixed-position reference stations is often referred to as Real-Time-Kinematic or RTK, and can produce sub-centimeter accuracy.

To gain a better understanding of the accuracy levels achievable by using the GPS system, it is necessary understand the two types of signals available from the GPS satellites. The first type of signal includes both the Coarse Acquisition (C/A) code, which modulates the L1 radio signal and the precision (P) code, which modulates both the L1 and L2 radio signals. These are pseudorandom digital codes that provide a known pattern that can be compared to the receiver's version of that pattern. By measuring the time-shift required to align the pseudorandom digital codes, the GPS receiver is able to compute an (DN 4165) unambiguous pseudo range to the satellite. Both the C/A and P codes have a relatively long "wavelength," of about 300 meters (1 microsecond) and 30 meters (1/10 microsecond), respectively. Consequently, use of the C/A code and the P code yield position data only at a relatively coarse level of resolution.

The second type of signal utilized for position determination is the carrier signal. The term "carrier", as used herein, refers to the dominant spectral component which remains in the radio signal after the spectral content caused by the modulated pseudorandom digital codes (C/A and P) is removed. The L1 and L2 carrier signals have wavelengths of about 19 and 24 centimeters, respectively. The GPS receiver is able to "track" these carrier signals, and in doing so, make measurements of the carrier phase to a small fraction of a complete wavelength, permitting range measurement to an accuracy of less than a centimeter.

Satellite-based augmentation systems (SBASs), such as the FAA's Wide Area Augmentation System (WAAS) and the European Geostationary Navigation Overlay Service (EGNOS), broadcast correction components for global navigation satellite system (GNSS, including the Global Positioning System (GPS)) positioning that include ionosphere correction maps, fast clock correctors, slow clock correctors and orbit correctors. A single-frequency GPS receiver receives these components over an SBAS broadcast signal, and using a troposphere model, differentially corrects its measured pseudo ranges, ultimately improving receiver positioning accuracy.

One of the problems with existing SBAS systems is that they are designed for use with single-frequency receivers, with which the ability of the SBAS system to correct ionosphere errors is one of the main limitations to achieving higher accuracy. SBAS systems model the ionosphere as a thin shell and fit ionosphere delay readings obtained with a network of dual-frequency GPS receivers to this shell. SBAS satellites then broadcast a vertical delay map of the shell to SBAS-enabled GPS receivers so that the single-frequency GPS receiver can correct ionosphere errors in its measured pseudo ranges. In the receiver, vertical delays are interpolated from the map and scaled according to an obliquity factor. However, the SBAS approach to correcting ionosphere errors is a first order approach and can have errors exceeding one half meter during normal operation and even tens of meters during high solar activity. This is particularly true as ionosphere gradients become large and the assumption of a thin shell breaks down.

Whitehead U.S. Pat. No. 6,397,147 discloses real-time, single-receiver relative GPS positioning using a technique where differential correction terms are computed at particular locations and instants of time, adjusted for atmospheric delays and then applied at later instants of time. The later GPS-defined positions are thus determined accurately relative to the earlier positions because the ionosphere errors are canceled out. This patent is assigned to a common assignee herewith and is incorporated herein by reference. Such relative positioning accuracy is often sufficient for applications not requiring absolute positioning accuracy, such as agricultural and machine control operations where the primary concern is positioning the equipment relative to its initial location or starting point. For example, agricultural equipment is often guided over fields in parallel swaths which are preferably located accurately relative to each other, but need not be precisely positioned in absolute GPS or other earth-based coordinates.

SBAS systems are designed to correct only L1(C/A) pseudo ranges including the problematic ionosphere delay component, but a dual frequency receiver can circumvent the need for ionosphere corrections by using L2(P) in combination with either L1(P) or L1(C/A) to form the ionosphere-free ranges. A bias, known as the inter-frequency bias, exists between L1(P) and L2(P). This bias is different for each GPS space vehicle and takes on a value ranging from a fraction of a meter to a couple of meters. The GPS satellites broadcast this bias in a term known as Tau-Group-Delay ($\tau_{GD}$), but due to word size, this broadcast has a limited resolution of 0.14 meters.

There is another bias, on the order of a few decimeters, between L1(C/A) and L1(P) that is also satellite dependant, but is not broadcast over the GPS navigation message (today). This bias is the inter-signal group delay code bias, referred to in the modernized GPS ICDs as $ISC_{L1C/A}$. Various organizations, particularly the Center for Orbit Determination in Europe (CODE) predict and maintain estimates of $ISC_{L1C/A}$ using a global network of monitoring Dual-Frequency GPS receivers.

A good discussion of these biases can be found in "Dual-Frequency GPS Precise Point Positioning with WADGPS Correctors" by Hyunho Rho and Richard Langely, Navigation Journal of The Institute of Navigation, Summer 2007, No. 2, Vol. 54, pp. 139-151.

SUMMARY OF THE INVENTION

Although SBAS systems are designed for operation with single-frequency receivers, dual-frequency receivers can apply the corrections as well if proper care is taken. The advantage of a dual-frequency receiver is that ionosphere-free code and carrier combinations can be formed that allow the receiver to circumvent the need for the SBAS ionosphere map. Thus, only SBAS clock and orbit correctors are required.

The L1(C/A)/L2(P) ionosphere-free combination is preferred over L1(P)/L2(P) due to the robustness of tracking L1(C/A) over tracking of L1(P). The aforementioned inter-frequency and inter-signal biases must be taken into account to properly apply SBAS corrections to the ionosphere-free combination involving L1(C/A) and L2(P). The $\tau_{GD}$ clock correction is not used when utilizing ionosphere-free observations, however, SBAS systems assume that $\tau_{GD}$ is applied so errors in broadcast $\tau_{GD}$ will be implicitly present in the SBAS corrections.

One additional bias, $B_{USER-SBAS}$, that must be considered, and which is not mentioned in other literature, takes into account any remaining errors; particularly biases of the SBAS system relative to the user's receiver. Such biases have been observed and may arise due to differences in the user receiver's tracking loops as compared to tracking loops deployed within the receivers comprising the SBAS network. The biases may also contain a portion resulting from systematic errors in the SBAS processing algorithms or receivers. Disclosed here is a method to compute a bias term, $B_{TOTAL}$, that includes $B_{USER-SBAS}$ as well as biases caused by un-modeled satellite inter-signal and inter-frequency delays. This method involves post-processing data that is collected using a dual-frequency GPS receiver situated in a known location. We note that different SBAS systems (WAAS and EGNOS for example) may lead to different biases.

All bias terms must be taken into account to achieve the highest-level of accuracy in a dual-frequency GPS Receiver employing SBAS corrections. Only the bias $\tau_{GD}$ is readily available to a conventional GPS receiver since it is broadcast in the GPS navigation message, albeit not at a high resolution (only 0.14 meters resolution). The remaining biases are not readily available to a conventional GPS receiver. The system of the present invention provides a means to upload and store the needed biases in a table within the receiver. The upload means can occur on a periodic basis to account for slow drifts in the biases, or to account for bias change due to satellite replacements. Also disclosed is a means to compute the needed biases.

To further improve performance, an additional step can be taken. Rather than relying solely on a troposphere model (such as the one provided in RTCA/DO-229D), the approach disclosed here is to estimate actual troposphere perturbations to a nominal model in real-time as the state of a Kalman filter. Such approaches have been taken in prior art, but not in combination with a dual-frequency receiver that forms ionosphere-free observations that are corrected with SBAS orbit and clock correctors, all in a real-time application giving superior navigation accuracy.

DETAILED DESCRIPTION OF THE PREFERRED EMBODIMENTS

I. Introduction and Environment

Figure 1:
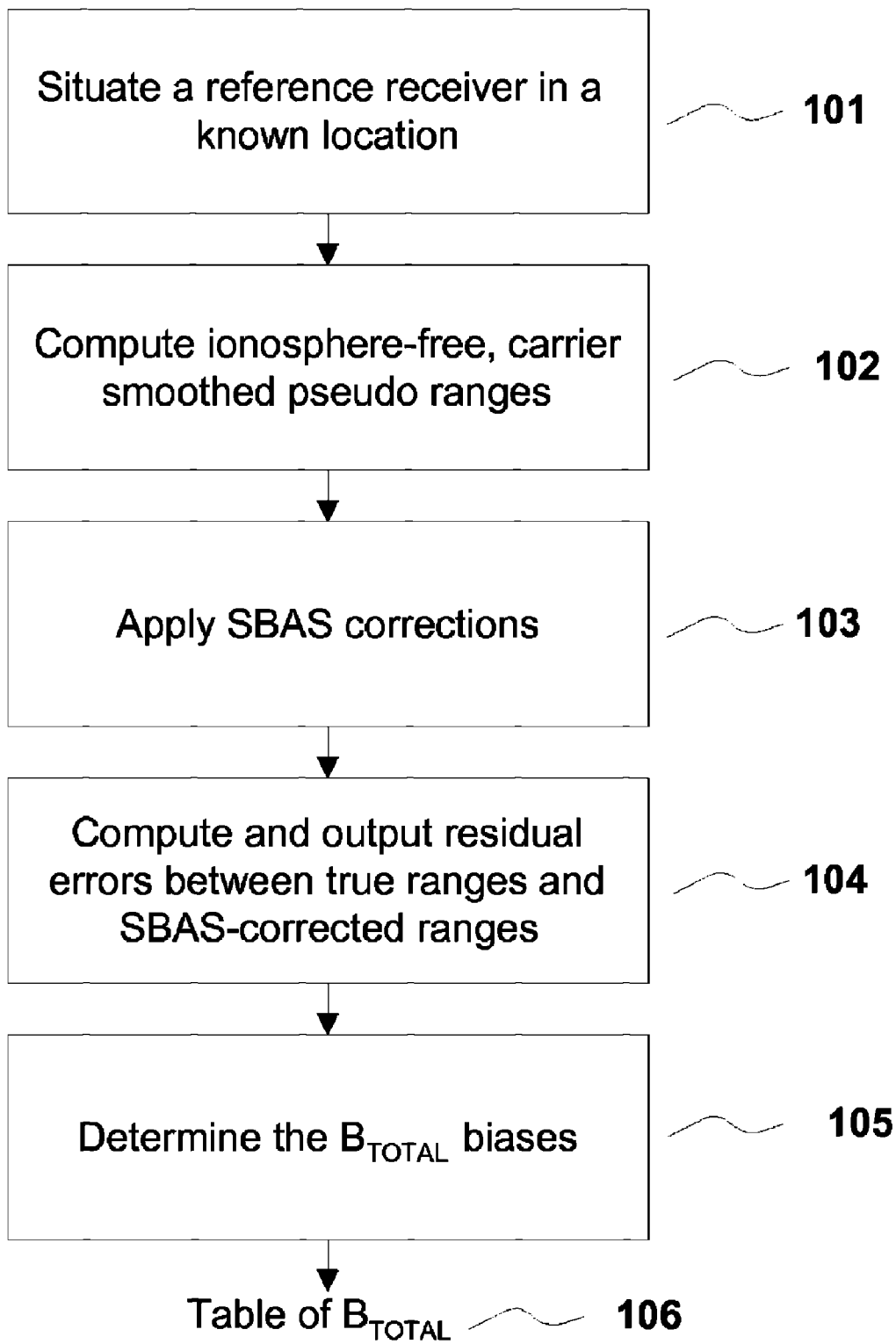
FIG. 1 is a flowchart showing the process of calibrating biases.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include GPS (U.S.), Galileo (proposed), GLONASS (Russia), Beidou (China), Compass (proposed), IRNSS (India, proposed), QZSS (Japan, proposed) and other current and future positioning technology using signals from satellites, with or without augmentation from terrestrial sources.

II. Preferred Embodiments

The GPS control segment computes satellite clock biases relative to the ionosphere-free pseudo ranges, $P_{iono\_free}$. Let $C_1$, $P_1$ and $P_2$ denote the pseudo ranges observed by a GPS receiver on L1(C/A), L1(P), and L2(P) respectively. Then, the ionosphere-free pseudo range is given by $$P_{iono\_free}=K_1P_1-K_2P_2$$

where $$K_1=F_1^2/(F_1^2-F_2^2)=2.546$$

$$K_2=F_2^2/(F_1^2-F_2^2)=1.546$$

and $F_1$=1575.42 MHz, $F_2$=1227.60 MHz

Note that $K_1-K_2=1$.

Due to group delays and inter-signal delays, there are slight biases between the three observables $C_1$, $P_1$ and $P_2$. Accordingly, define the inter-signal code bias, $ISC_{L1/CA}$, as $$ISC_{L1/CA}=P_1-C_1$$

and the inter-frequency bias, $B_{P2-P1}$, as $$B_{P2-P1}=P_2-P_1$$

$B_{P2-P1}$ is related to the group delay, known as $\tau_{GD}$ in the GPS Interface Control Document, ICD-GPS-200, by the following relationship:

$$\tau_{GD}=K_2B_{P2-P1}$$

Since we are concerned with satellite biases, we shall write the observation equations with the assumption that the GPS receiver clock is perfect, and that there are no atmosphere effects, multipath noise, thermal noise or other error sources aside from satellite clock errors. This greatly simplifies the equations, allowing us to focus on the relevant clock terms. With the assumption of perfect user clock, we eventually solve for this common-mode term when computing the GPS solution.

Ignoring all but satellite clock biases, the three observation equations become:

$$C_1=R-(T_{SV}-\tau_{GD})-ISC_{L1/CA}$$

$$P_1=C_1+ISC_{L1/CA}=R-(T_{SV}-\tau_{GD})$$

$$P_2=P_1+B_{P2-P1}=R-(T_{SV}-\tau_{GD})+B_{P2-P1}$$

where R is geometric range (true range), and $T_{SV}$ is the satellite clock bias relative to ionosphere-free observation, $P_{iono\_free}$. The GPS Control Segment uses the $P_1/P_2$ ionosphere-free observation when computing its estimate of $T_{SV}$ which is why $T_{SV}$ is relative to $P_{iono\_free}$.

There are actually two ionosphere-free combinations of interest; one involves the use of a $P_1/P_2$ code combination while the other uses the more reliable $C_1/P_2$ combination. These are:

$$P_{iono\_free} = K_1 P_1 - K_2 P_2$$
$$= R - T_{SV} + \tau_{GD} - K_2 B_{P2-P1}$$
$$= R - T_{SV}$$

and $$P^{CA}_{iono\_free} = K_1 C_1 - K_2 P_2$$
$$= R - T_{SV} + \tau_{GD} - K_2 B_{P2-P1} - K_1 ISC_{L1/CA}$$
$$= R - T_{SV} - K_1 ISC_{L1/CA}$$

where we have used the relationship $\tau_{GD}=K_2 B_{P2-P1}$ to simplify.

Both ionosphere-free observations, are, as their name implies, free of any ionosphere induced delays. They are desirable since they enable a receiver to overcome one of the largest remaining sources of error in single frequency SBAS positioning: the un-modeled ionosphere. SBAS cannot provide a perfect ionosphere map, and it is better to simply cancel out the ionosphere effects using these ionosphere-free observations.

When SBAS sends clock correctors, the clock correctors are relative to the $C_1$ observable, not the ionosphere-free observations. In computing these corrections, the SBAS system assumes (see RTCA/DO-229D) that the user receiver will apply the GPS broadcast clock model, $T_{SV}^{GPS}$ as well as the broadcast group-delay, $\tau_{GD}^{GPS}$. The superscript "GPS" indicates that $T_{SV}^{GPS}$ and $\tau_{GD}^{GPS}$ are estimates provided by the GPS Control Segment rather than the true values. The GPS navigation message, which is modulated on the GPS transmitted signals, contains coefficients of a time-based polynomial fitting $T_{SV}^{GPS}$. The navigation message contains a single word providing the group-delay, $\tau_{GD}^{GPS}$. Each satellite sends its respective, satellite-specific values for the above quantities.

The SBAS clock correction, $T_{SBAS}$, although provided by SBAS systems as a single quantity, can be broken down into its individual constituents as follows:

$$T_{SBAS}=T_{SV}-T_{SV}^{GPS}+ISC_{L1/CA}-(\tau_{GD}-\tau_{GD}^{GPS})$$

In the above equation, it is assumed that SBAS does a perfect job of correcting the clock errors in the $C_1$ observable. In other words, the SBAS system makes no errors when predicting $T_{SV}$, $ISC_{L1/CA}$, and (which, we note, it does as a lumped clocked correction rather than separately as we have shown). While this is not precisely true, it is a sufficient assumption for the purpose of explanation, and as will later be shown, long-term systematic errors are treated as biases that we can compute and eliminate.

According to the SBAS specification, the SBAS clock correction is added to the $C_1$ observable while the conventions outlined in the ICD-GPS-200 are followed with respect to use of $T_{SV}^{GPS}$ and $\tau_{GD}^{GPS}$. Thus, the SBAS-corrected pseudo range becomes $$\text{SABS corrected } L1(C/A) \text{ pseudo range}=C_1+T_{SV}^{GPS}-\tau_{GD}^{GPS}+T_{SBAS}$$

or, substituting in the constituents of $C_1$ and $T_{SBAS}$ we get $$\text{SBAS corrected } L1(C/A) \text{ pseudo range}=[R-(T_{SV}-\tau_{GD})-ISC_{L1/CA}]+T_{SV}^{GPS}-\tau_{GD}^{GPS}+[T_{SV}-T_{SV}^{GPS}+ISC_{L1/CA}-(\tau_{GD}-\tau_{GD}^{GPS})]=R$$

As can be seen, if SBAS does a perfect job correcting the clocks, the corrected pseudo range becomes the true geometric range R, (ignoring all non-clock errors) as desired.

Now, consider a similar application of the SBAS correctors to the ionosphere-free combination based on $C_1/P_2$; namely $P_{iono\_free}^{CA}$. Here, according to the ICD-GPS-200, we should not subtract $\tau_{GD}^{GPS}$, at least that is the case when using the $P_1/P_2$ ionosphere-free observable. We will denote the SBAS-corrected ionosphere-free observable as $P_{iono\_free\_corrected}$ $$P_{iono\_free\_corrected}^{CA}=K_1 C_1-K_2 P_2+T_{SV}^{GPS}+T_{SBAS}+B_{ISC\_TGD}$$

The term, $B_{ISC\_TGD}$, is a bias that must be added for proper application of SBAS correctors to the $C_1/P_2$-based ionosphere-free combination. Its need (and its value) will become evident in the subsequent derivation. Expanding terms, we get $$P_{iono\_free\_corrected}^{CA} = R - T_{SV} - K_1 ISC_{L1/CA} + T_{SV}^{GPS} +$$
$$[(T_{SV} - T_{SV}^{GPS}) + ISC_{L1/CA} - (\tau_{GD} - \tau_{GD}^{GPS})] +$$
$$B_{ISC\_TGD}$$
$$= R - (K_1 - 1)ISC_{L1/CA} - (\tau_{GD} - \tau_{GD}^{GPS}) + B_{ISC\_TGD}$$
$$= R - K_2 ISC_{L1/CA} - (\tau_{GD} - \tau_{GD}^{GPS}) + B_{ISC\_TGD}$$

In order to get the desired result, $B_{ISC\_TGD}$ must be taken as follows:

$$B_{ISC\_TGD}=K_2 ISC_{L1/CA}+(\tau_{GD}-\tau_{GD}^{GPS})$$

With this, we have $$P_{iono\_free\_corrected}^{CA}=R$$

We see that $B_{ISC\_TGD}$ accounts for the inter-signal code bias, $ISC_{L1/CA}$, as well as any errors or round-off in the precision of $\tau_{GD}^{GPS}$.

One more bias that must be included is one not included in previous literature, which we shall denote as $B_{USER-SBAS}$. This bias accounts for differences between the code tracking-loops in the SBAS's network of GPS receivers and code tracking-loops in a user's GPS receiver (different multipath mitigation techniques and receiver group-delays can result in different biases). It also accounts for any other implementation-specific biases between the SBAS system and user receiver. One way to describe $B_{USER-SBAS}$ is a bias that models the difference between the pseudo range measured in a receiver that would be corrected perfectly by SBAS, and the pseudo range measured in a receiver that is actually being deployed. The total bias that must be taken into account when using SBAS corrector with the ionosphere-free $C_1/P_2$ combination is $$B_{TOTAL}=B_{ISC\_TGD}+B_{USER-SBAS}$$

In the exemplary embodiment, this bias, $B_{TOTAL}$, is stored in the non-volatile memory of the user's GPS receiver, one for each GPS space vehicle. The biases have been observed to be nearly constant, varying slowly over time and only taking dramatic steps upon replacement of a space vehicle. Consequently, frequent uploads of biases to receiver non-volatile memory is not necessary. Uploads can be done on a periodic basis which will typically be on the order of several months to a year. Biases should be monitored for substantial changes so that new bias tables can be made available. We note that one component of the biases, the $ISC_{L1/CA}$ bias, is monitored by the Center for Orbit Determination in Europe (CODE) where results are made public via the Internet. However, for best results it is recommended that biases are monitored and computed using the exact type of GPS receivers for which the bias will be utilized. Particularly since CODE uses a network of receivers from different manufacturers to compute their bias estimates based on an average of all contributing receiver data.

Rather than compute $B_{TOTAL}$ as the sum of individual components, it can be computed as one lumped bias. This is accomplished by replacing $B_{ISC\_TGD}$ with $B_{TOTAL}$ in the equation for $P_{iono\_free\_corrected}^{CA}$. The process of computing $B_{TOTAL}$ will be referred to as calibration mode.

During calibration mode, a receiver is situated in a known location and configured to gather carrier-smoothed, ionosphere-free pseudo ranges corrected with SBAS orbit and clock correctors. Smoothing can take place indefinitely since there is no divergence between code and carrier with the ionosphere-free combinations.

The carrier-smoothed, ionosphere-free pseudo ranges, corrected with SBAS are computed as $$P_{iono\_free\_corrected}^{CA} = (K_1 C_1 - K_2 P_2)^{SMOOTH} + T_{SV}^{GPS} - T_{USER} + T_{SBAS} + \text{TropoModel}$$

where
$(K_1 C_1 - K_2 P_2)^{SMOOTH}$ is the carrier-smoothed, ionosphere-free pseudo range
$T_{SV}^{GPS}$ is the GPS broadcast SV clock model
$T_{USER}$ is the user clock estimate, common to all observations
$T_{SBAS}$ is the SBAS clock correction (both fast and slow)
TropoModel is a nominal model of the troposphere delay, as for example, the model in RTCA/DO 229, Appendix A A residual is formed for each satellite by subtracting the geometric (truth) range of the satellite from $P_{iono\_free\_corrected}^{CA}$. The truth range, $R_{truth}$, is computed using the GPS broadcast ephemeris (correcting with SBAS orbit correctors) and the known receiver location, ideally adjusted for solid Earth tide variations in altitude.

The residual includes the desired bias, $B_{TOTAL}$, plus other error terms. That is $$\text{residual} = P_{iono\_free\_corrected}^{CA} - R_{truth} = B_{TOTAL} + \text{Other}$$

Other is all other sources of error aside from those constant errors making up $B_{TOTAL}$.
The term "Other" would include the following:
  Un-modeled troposphere—This is the troposphere perturbations from the model. We attempt to estimate this source of error in post processing.
  Errors in the user clock, $T_{USER}$,—These errors are common to all satellites and are removed in post processing by estimating it and differencing it away.
  Time varying errors in $T_{SBAS}$,—These are due to the fact the SBAS system is not perfect. They are treated as noise. Note that any constant errors that persist for days will be lumped into $B_{TOTAL}$.
  Effects of Solid Earth tides.—These are actually not errors but variations in the receiver location (up to 30 cm) due to solid Earth tide fluctuations in receiver altitude. A model of solid Earth tides should be utilized to adjust the receiver truth location accordingly. If a model is not used, data should be taken over multiple days so that the Earth tidal effects can be averaged out.
  Multipath and other noise—the antenna should be a choke ring or equivalent and placed in a good location.

Residual terms are gathered, ideally over multiple days for better averaging away of noise effects. Post processing of the residuals then yields the desired biases. In the crudest form of post-processing, residual data is simply plotted and systematic shifts in residuals are visually determined. The eye is generally good at averaging out time-varying effects, such as those mentioned above.

A more systematic approach to calibrating the biases is to use a Kalman filter or a least-squares method to estimate and remove the effects of un-modeled troposphere errors, common clock errors, and to effectively time-average the data. The state vector of a Kalman filter is comprised of a troposphere perturbation state and a clock state, both of which are allowed to vary (a random-walk process), and the $B_{TOTAL}$ biases, one per satellite, each of which is assumed to be constant in the Kalman process model. The troposphere state is a perturbation from the model of the troposphere, and its effect on the residual observations is through a mapping function based on satellite elevation angle. By estimating and removing troposphere and clock effects, the Kalman filter is able to effectively estimate the $B_{TOTAL}$ bias terms (essentially these biases are a time-average of what is left in the residual errors after removing troposphere and clock offsets).

As mentioned, $B_{TOTAL}$ encompasses inaccuracies in the assumed $\tau_{GD}$ and $ISC_{L1C/A}$ as well as SBAS system-to-user-receiver biases. Clearly, portions of $B_{TOTAL}$ (such as the $ISC_{L1C/A}$ or $\tau_{GD}$ contribution) can be determined in advance by other methods, for example, $ISC_{L1C/A}$ can be determined simply by averaging $P_1 - C_1$. In this case, the known bias contributions are removed up-front during the calibration process. Only the remaining portions of $B_{TOTAL}$ are then calculated and, following calibration, these remaining portions are summed together with the known biases to yield the desired total bias, $B_{TOTAL}$.

Having performed the bias calibrations, a table of satellite biases (a separate $B_{TOTAL}$ for each satellite) is made available for upload to receivers in the field. This could be via the internet (with a web-based server for example) or the bias table could be loaded onto a memory stick that is plugged into the individual receivers. The user may manually enter the bias table into the receiver through issuing a command over one of the receiver's RS-232 com ports, or the process may be automated, such as simply connecting the receiver to a PC and letting software take over. The receiver then stores the biases in non-volatile memory for subsequent use. Other approaches can be taken which are obvious to those skilled in the art. Biases are re-computed and made available on a periodic basis or as new satellites are launched.

FIG. 1 shows the process of calibrating biases. Blocks 101 through 105 provide a high-level summary of the process steps described above. Slight variations to these steps and their sequence will be apparent to those skilled in the art and within the scope of the present invention. At step 101 a reference receiver is situated at a known location. Ionosphere-free, carrier-smoothed pseudo ranges are computed at 102 and SBAS corrections are applied at 103. Residual errors between true ranges and SBAS-corrected ranges are computed and output at 104 and the $B_{TOTAL}$ biases are determined at 105.

In summary, a single receiver situated at a known location can be used to calibrate biases (producing a table of $B_{TOTAL}$ at 106) that can later be provided (by some means) to a large number of receivers in the field. The process of FIG. 2 is done periodically to monitor and capture slow changes in biases, or is done when new satellites enter the constellation.

With the biases known and accounted for, the SBAS orbit and clock are applied to the ionosphere-free range observations resulting in improved accuracy in a dual-frequency GPS receiver. As was the case during calibration, smoothing of ionosphere-free code against ionosphere-free carrier (for example, a Hatch filter) is employed for best results. Smoothing can take place indefinitely since there is no divergence between code and carrier with the ionosphere-free combinations. This is unlike a single-frequency receiver where smoothing intervals must be limited as a result of code/carrier divergence. In practice, a two hour smoothing window would typically be sufficient for many applications.

Figure 2:
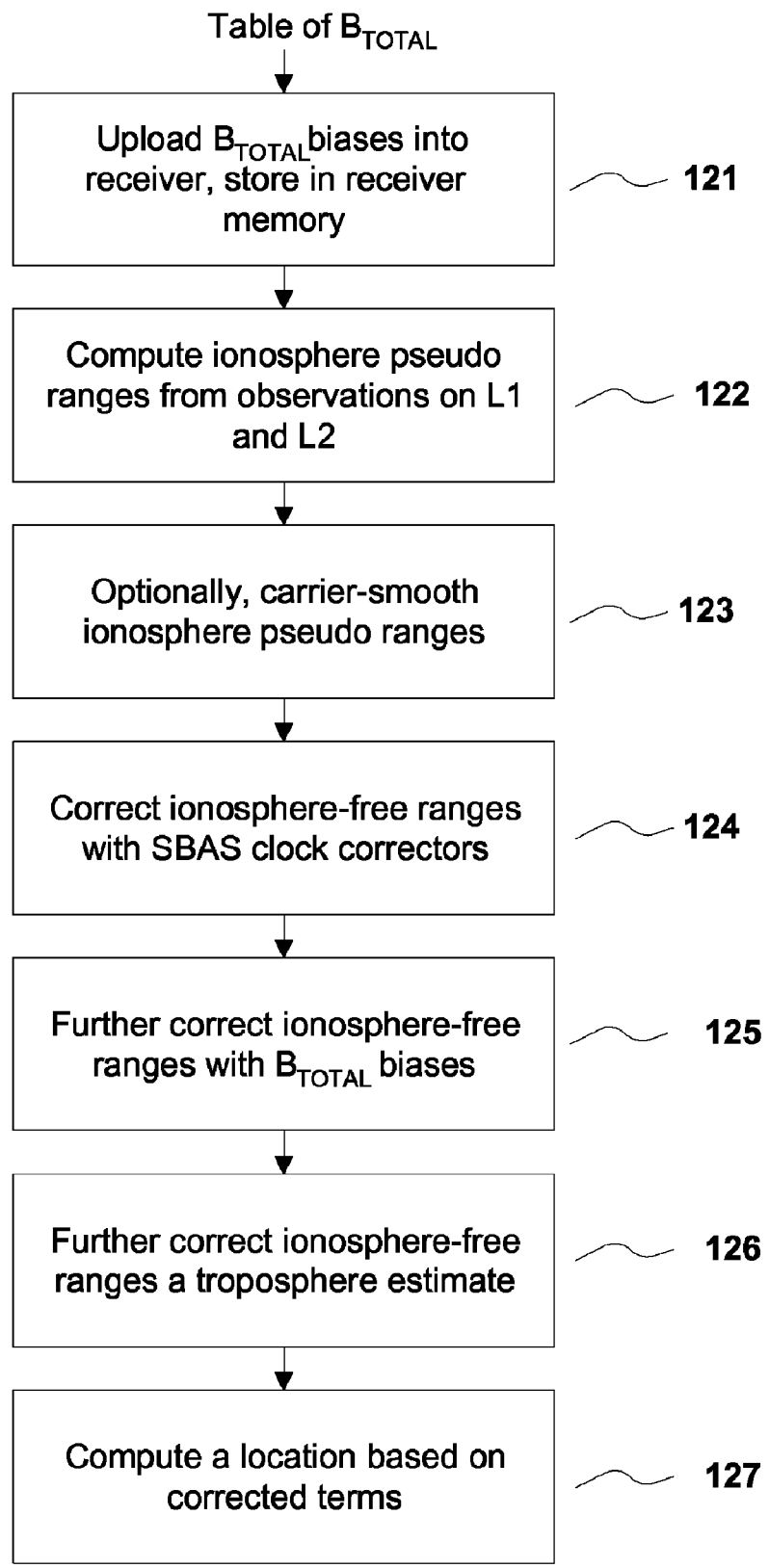
FIG. 2 is a flowchart showing the use of the $B_{TOTAL}$ biases in a GNSS receiver.

FIG. 2 outlines the use of the $B_{TOTAL}$ biases in a GNSS receiver. As shown in block 121, the biases are first uploaded into the receiver. During operation, the GNSS receiver computes ionosphere-free pseudo ranges at 122 and then (optionally) applies carrier smoothing to these ranges at 123. Corrections are then made using SBAS clock correctors at 124, the $B_{TOTAL}$ biases at 125 and modeled or estimated troposphere delays at step 126. Using the corrected pseudo ranges, a location is then computed as shown in 127. SBAS ephemeris corrections are applied as well. In fact, all SBAS corrections can be applied as described in RTCA/DO 229D, Appendix A with the exception of the ionosphere corrections. The other major difference is that we have introduced the $B_{TOTAL}$ bias corrections and we no longer apply $\tau_{GD}$ since it is not used with ionosphere-free pseudo ranges.

In the exemplary embodiment of the present invention an additional step is taken to improve accuracy. This step is the estimation of residual troposphere content in the observed pseudo ranges. Having removed ionosphere error using ionosphere-free combinations and correcting clock and orbit errors using SBAS corrections, troposphere model errors start to become relevant and limit overall accuracy. However, with a sufficient numbers of satellites (5 or more), perturbations in the troposphere relative to the model can be estimated in real-time.

A state that models a troposphere zenith delay perturbation is estimated by a Kalman filter that also simultaneously estimates receiver location, clock, and other navigation quantities of interest. In another embodiment, the Kalman filter can ignore a nominal model altogether and estimate the entire zenith troposphere, not just a perturbation to a nominal model. In constructing the Kalman filter, measurements are assumed to be impacted by the troposphere zenith delay scaled by a mapping function that maps zenith into a slant delay based on satellite elevation angle.

A Kalman filter state vector will consist of position (x,y,z), time, t, and troposphere, $\tau$ plus possibly other quantities such as velocity or past positions.

$$X = \begin{bmatrix} x \\ y \\ z \\ t \\ \tau \\ \vdots \end{bmatrix}$$

The Kalman residual, for satellite, j, is defined as $$\text{residual}^j = R_{measured}^j - R_{predicted}^j$$

where
$R_{measured}^j$=the $j^{th}$ satellite's measured pseudo range
and
$R_{predicted}^j$=the $j^{th}$ satellite's predicted range, where the prediction is based on the current state, X, of the Kalman filter.

The Kalman filter is based on a linearization of the non-linear range equations. The partials of the residual with respect to X giving $$\partial(\text{residual}^j) = -[H^j]/[\partial X]$$

where
$H^j = [u_x^j, u_y^j, u_z^j, 1, M^j, \ldots]$ is the $j^{th}$ row of what is frequently referred to as the design matrix and is the matrix needed for Kalman filter design, or least squares solution. The first 3 elements of $H^j$, $[u_x^j, u_y^j, u_z^j,]$, are a unit vector from satellite j to the current location X, and $M^j$ is a troposphere mapping function for satellite j. The clock, t, is mapped through unity (the $4^{th}$ element of $H^j$).

The troposphere mapping function, is taken as $$M^j = \frac{1.001}{\sqrt{0.002001 + \sin^2(El^j)}}$$

where $El^j$ is the elevation angle of satellite j.

The Kalman time-update of troposphere state can follow a simple linear model which exponentially correlates over time. The following equation shows the Kalman process model for the update of the troposphere state, $\tau$, from time k, to time k+1, $$\tau(k+1) = f_{Trop}\tau(k) + g_{Trop}n(k)$$

$$f_{Trop} = \exp^{(-Ts/Tc)}, g_{Trop} = \sqrt{P - f_{Trop}^2 P}$$

Here, n(k) is unit white noise, $T_s$ is the Kalman sample period, Tc is the troposphere time-correlation period, and P is the troposphere auto-correlation power. Typical values for Tc are one to several hours and P is on the order of centimeters since $\tau(k)$ represents a perturbation from nominal troposphere.

The equations given above are sufficient, for one skilled in the art, to design a Kalman filter estimator for the navigation state that includes a troposphere delay estimate in addition to receiver location and receiver clock.

It is to be understood that the invention can be embodied in various forms, and is not to be limited to the examples discussed above.

Having thus described the invention, what is claimed as new and desired to be secured by Letters Patent is:

1. A GNSS receiver system for receiving signals from GNSS satellites, including at least one SBAS satellite, which receiver system includes:
    a receiver including a nonvolatile memory adapted for storing a table of bias corrections for at least one GNSS satellite;
    each bias correction including at least one of a group delay correction component and an inter-signal bias correction component; and
    an ionosphere-free pseudo range being SBAS-corrected using data broadcast in the SBAS signal as well as data in the bias correction table according to the formula:

$$[R - (T_{SV} - \tau_{GD}) - ISC_{L1/CA}] + T_{SV}^{GPS} -$$
$$\tau_{GD}^{GPS} + [T_{SV} - T_{SV}^{GPS} + ISC_{L1/CA} - (\tau_{GD} - \tau_{GD}^{GPS})] = R$$

wherein:
    the GPS broadcast clock model=$T_{SV}^{GPS}$;
    the broadcast group-delay=$\tau_{GD}^{GPS}$;
    the superscript "GPS" indicates that $T_{SV}^{GPS}$ and $\tau_{GD}^{GPS}$ are estimates provided by
    the GPS Control Segment rather than the true values;

the GPS navigation message, which is modulated on the GPS transmitted signals, contains coefficients of a time-based polynomial fitting $T_{SV}^{GPS}$;

the navigation message contains a single word providing the group-delay, $\tau_{GD}^{GPS}$;

each satellite sends its respective, satellite-specific values for the above quantities; and the SBAS clock correction, $T_{SBAS}$, can be broken down into its individual constituents as follows:

$$T_{SBAS} = T_{SV} - T_{SV}^{GPS} + ISC_{L1/CA} - (\tau_{GD} - \tau_{GD}^{GPS})$$

$$P_{iono\_free\_corrected}^{CA} = K_1 C_1 - K_2 P_2 + T_{SV}^{GPS} + T_{SBAS} + B_{ISC\_TGD}$$

$$B_{ISC\_TGD} = K_2 ISC_{L1/CA} + (\tau_{GD} - \tau_{GD}^{GPS}); \text{ and}$$

$$P_{iono\_free\_corrected}^{CA} = R.$$

2. The GNSS receiver system of claim 1, which includes: a Kalman filter adapted for estimating the troposphere as its state.

3. The system of claim 1, which includes:
said GNSS receiver comprising a dual frequency receiver using one of:
L2(P) and L1(P); and
L2(P) and L1(C/A).

4. The system of claim 1, which includes means for calibrating the biases using either:
a Kalman filter or a least squares method to: estimate and remove the effects of un-modeled troposphere errors and clock errors; and to effectively time-average the data.

5. The method of claim 1, which includes means for providing a separate $B_{TOTAL}$ value for each of multiple GNSS satellites.

6. A GNSS receiver system for receiving pseudo range signals from GNSS satellites, including at least one SBAS satellite, which receiver system includes:

a receiver including a nonvolatile memory adapted for storing a table of bias corrections for at least one GNSS satellite;

a microprocessor controller connected to said GNSS receiver;

each bias correction including at least one of a group delay correction component and an inter-signal bias correction component;

the pseudo range signals being bias-corrected using data broadcast in the SBAS signal as well as data in the bias correction table; and the pseudo range being SBAS-corrected using a GNSS broadcast clock model and a broadcast group delay, each satellite sending respective satellite-specific correction values and the biases being calibrated using a Kalman filter or a least squares method to estimate and remove the effects of un-modeled troposphere errors and clock errors and to effectively time-average the data.

* * * * *